United States Patent
Zapp

[11] Patent Number: 5,321,547
[45] Date of Patent: Jun. 14, 1994

[54] MONOCULAR TELESCOPE

[76] Inventor: Walter Zapp, c/o Minox GmbH, Postfach 6020, D-6300 Giessen 1, Switzerland

[21] Appl. No.: 929,925
[22] Filed: Aug. 17, 1992

[30] Foreign Application Priority Data
Feb. 19, 1990 [DE] Fed. Rep. of Germany ....... 9001937

[51] Int. Cl.⁵ ...................... G02B 23/08; G02B 23/10; G02B 23/16
[52] U.S. Cl. ................................. 359/431; 359/402; 359/403; 359/418; 359/428; 359/438; 359/819; 359/511; 359/420; D16/132
[58] Field of Search ............... 359/431, 402, 403, 405, 359/418, 419, 420, 511; D16/132

[56] References Cited
U.S. PATENT DOCUMENTS

| | | | |
|---|---|---|---|
| 715,993 | 12/1962 | Harvey | 359/431 |
| 1,837,207 | 12/1931 | Cover | 359/431 |
| 2,433,338 | 12/1947 | Brown | 359/420 |
| 2,512,153 | 6/1950 | Hehyey et al. | 359/420 |
| 3,409,343 | 11/1968 | Zapp | 359/431 |
| 4,573,773 | 3/1986 | Arndt et al. | 359/431 |
| 4,704,000 | 11/1907 | Pekar | 359/402 |
| 4,795,235 | 11/1989 | Spitzberg | 359/431 |

FOREIGN PATENT DOCUMENTS

WO89/05990  6/1989  PCT Int'l Appl. .
2051403     2/1934  United Kingdom .
1118057     6/1963  United Kingdom ................ 359/403

OTHER PUBLICATIONS

Patent Abstracts of Japan, vol. 8, No. 179 (P-295)(1616), Aug. 17, 1984, & JP, A, 5972416 (Minolta) Apr. 24, 1984.
Patent Abstracts of Japan, vol. 8, No. 72 (P-265)(1509), Apr. 4, 1984, & JP, A, 58217911 (Hoya Glass K.K.) Dec. 19, 1983.

Primary Examiner—Jon W. Henry
Attorney, Agent, or Firm—Evenson, McKeown, Edwards & Lenahan

[57]  ABSTRACT

A monocular telescope in which the beam path is so laid out that the casing may be flat in the direction of view, and the optical axis of the beam path in the casing describes a somewhat rectangular route, and in which the telescope has a view finder beam path intesecting with the telescope beam path in the users eye.

31 Claims, 4 Drawing Sheets

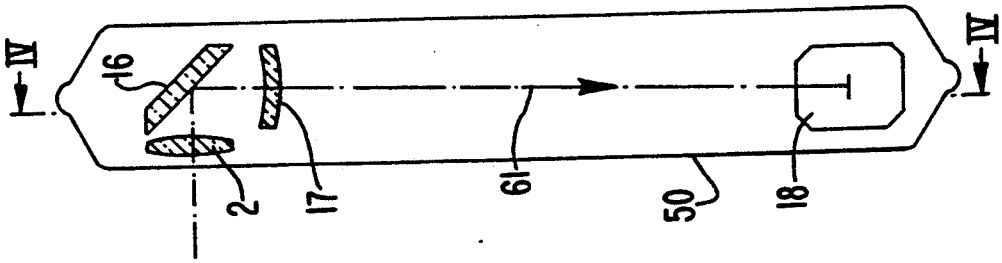
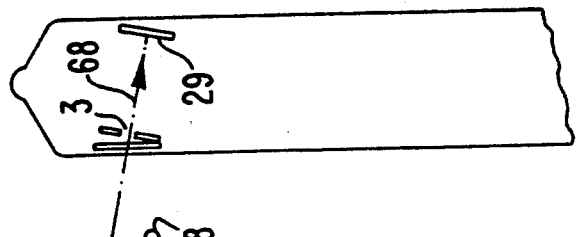
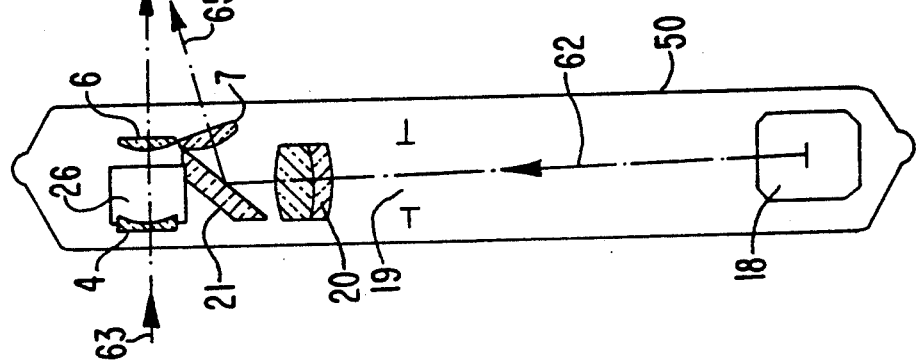
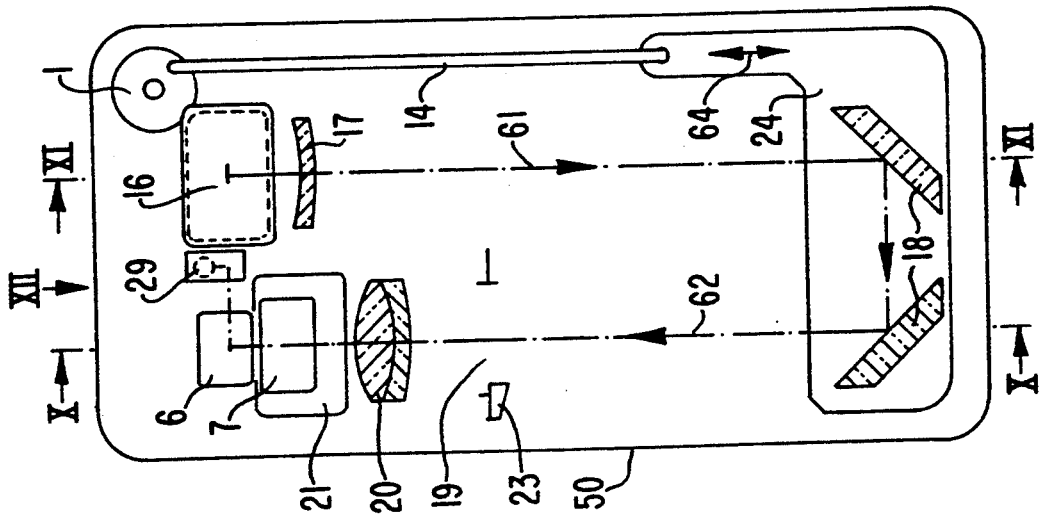

MONOCULAR TELESCOPE

CROSS REFERENCE TO RELATED APPLICATIONS

This application is a continuation of my copending PCT international patent application No. PCT/EP91/00269, filed Feb. 11, 1991, designating the United States of America.

BACKGROUND OF THE INVENTION

This invention relates to a monocular telescope with a view finder in which the telescope and the view finder have a common sighting direction.

In the case of great magnification, the field of view of such a telescope is small, so that it is difficult to sight a particular object.

SUMMARY OF THE INVENTION

It is the object of the invention to provide a monocular telescope with a view finder, such that, with the telescope remaining stationary, the user needs only to turn an eye to shift from the view finder image to the telescope image and vice-versa.

This and other objects of the invention are achieved by providing a monocular telescope having a view finder, wherein the telescope and the view finder have a common sighting direction, a mirror system is provided in the telescope beam path, the view finder comprises at least one view finder objective and a view finder eyepiece which have an optical axis, the telescope comprises at least one telescope objective and a telescope eyepiece with an eye lens, and the axes of the view finder eyepiece and of the telescope eyepiece intersect behind the eyepiece at the pivot point of an observer's eye.

With the telescope of the invention a user is able to sight an object with the view finder in a relatively large field of view and, with the telescope held stationary, needs only to change the line of sight of the eye slightly in order then to see an enlarged image of the sighted object in the telescope. In such a case the pivot point of the eye is determined by the intersection of the optical axes of the view finder eyepiece and the telescope eyepiece. The eye will be placed at this point anyway in the use of the telescope, that is, the location of the eye does not need to be changed.

To permit the telescope to be operated easily and enable the beam paths of the view finder eyepiece and of the telescope eyepiece to meet at the pivot point of the eye, the telescope and view finder are contained in a common casing, and the casing has a flat configuration as seen in the viewing direction. The view finder beam path can in this case pass through the casing through its flat side, approximately in the direction of the telescope aim. Because of its greater length the telescope beam path is folded within the casing.

Since the casing is flat, like a cigarette case or billfold or the like, such a telescope can be contained in a pocket in an article of clothing. Nevertheless, the telescope performs like any other monocular telescope.

In the preferred embodiment of the invention, the objective and ocular lenses are situated virtually in the immediate vicinity of the outer wall of the casing. In a further refinement of the invention, covers are provided to protect the objective and ocular lenses, which can be operated by turning an easily-reached knob, for example in one of the upper corners of the telescope casing.

Operating means, such as those provided for focusing, are also advantageously provided in one of the upper corners of the casing.

For the telescope to have a flat configuration, it is necessary that the course of the imaging beam path be flat. This is accomplished on the one hand by dividing the front lens of the objective and interposing a first mirror, and on the other hand by the flat, folded path of the beam within the casing.

Provision is made for focusing by making two of the mirrors displaceable along the doubled-back objective axis. This can be done by means of a knob provided on the casing.

Additional details of the invention are found in the following description.

BRIEF DESCRIPTION OF THE DRAWINGS

The invention will be described in further detail with reference to a preferred embodiment illustrated in the accompanying drawings in which:

FIG. 7 is a diagram of the optical structure of the telescope as seen in FIG. 3;

FIG. 8 shows the optical structure of FIG. 7 in a lateral view, section X—X of FIG. 7;

FIG. 9 shows the beam path of the view finder and of the circle of light (30);

FIG. 10 is a sectional view taken along line XI—XI of FIG..7;

DETAILED DESCRIPTION OF PREFERRED EMBODIMENTS

Figure 1:
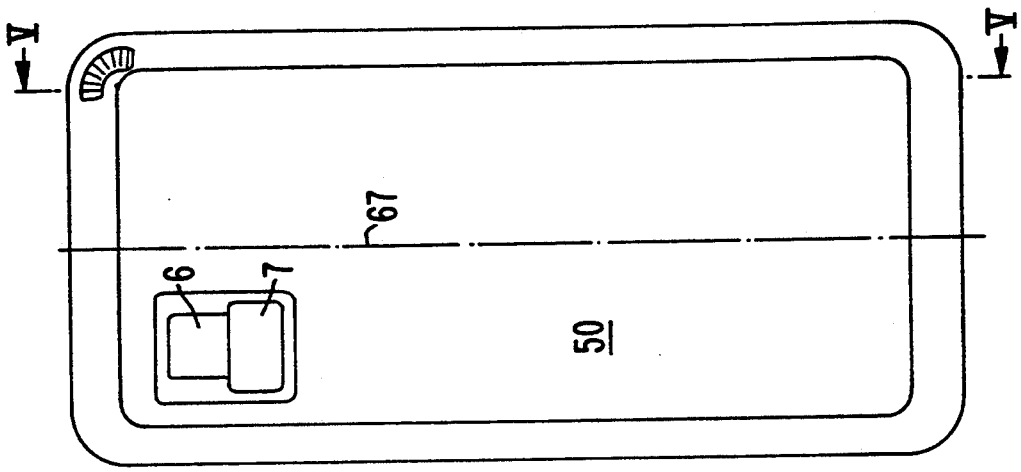
FIG. 1 is a front view of the telescope of the invention.
Figure 2:
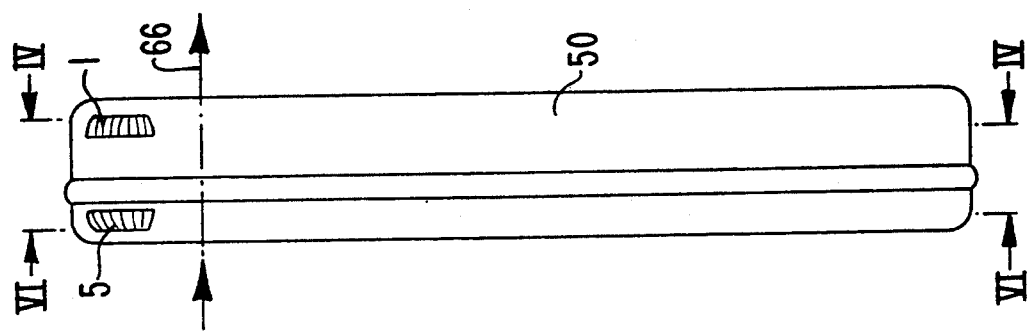
FIG. 2 is a side view of the telescope.
Figure 3:
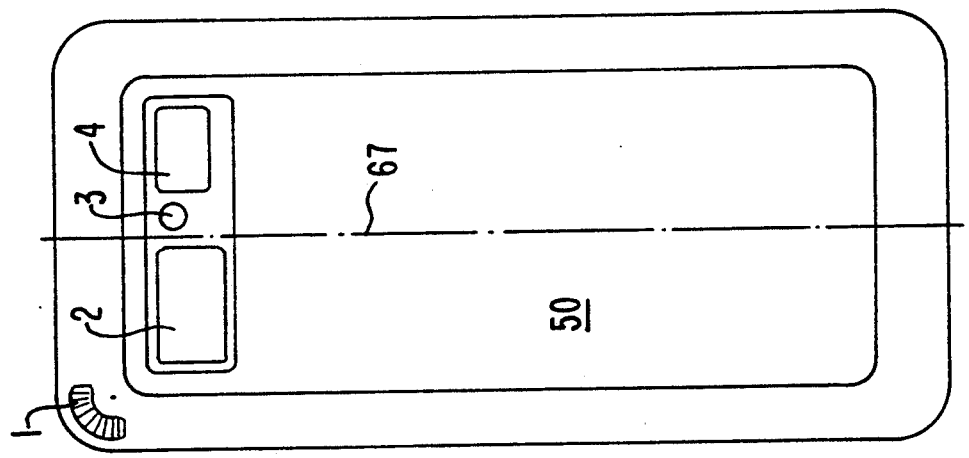
FIG. 3 is a back view of the telescope.

As can be seen in FIGS. 1 to 3, the casing 50 of the telescope is of rectangular shape. FIG. 1 shows the front view of the casing. The front lens of the telescope objective is identified by 2, and the front lens of the view finder objective has the reference number 4. Also, on the front of the casing is light-admitting opening 3 for illuminating a mark in the view finder image.

Figure 6:
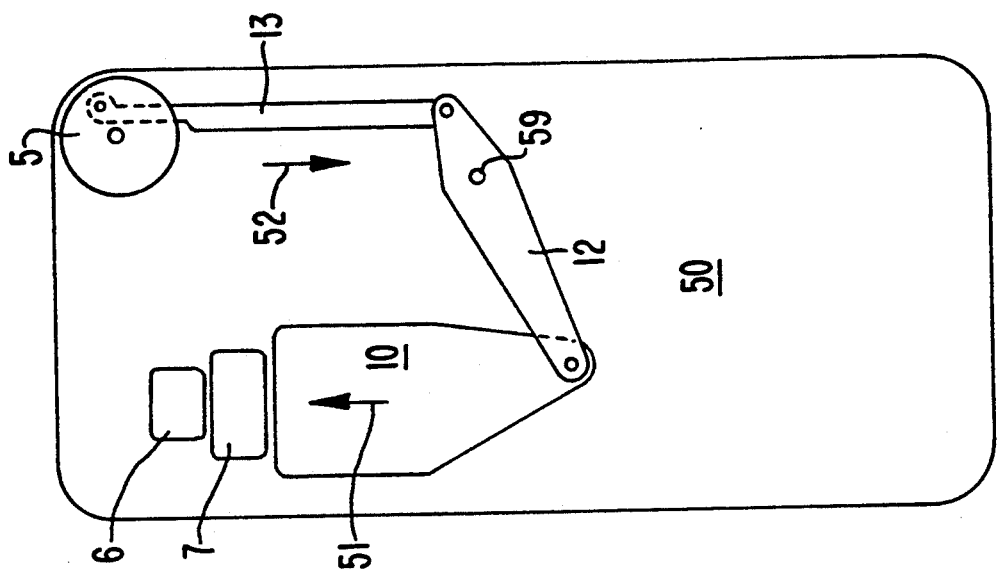
FIG. 6 is a sectional view taken along line VI—VI of FIG. 2, section IV—IV of FIG. 10.

A knob produces the focusing of the telescope. Another knob 5 (FIG. 6) acts, through an articulation 13, 12, on a covering plate which is displaceable in the direction of the arrow 51 in order to cover the view finder eyepiece 6 as well as the telescope eyepiece 7 (FIG. 6) when they are not in use. At the same time knob 5, by means of levers 13 and 9, also operates a covering plate 8 for the front lenses of the telescope objective and view finder objective when the telescope is not in use.

Figure 5:
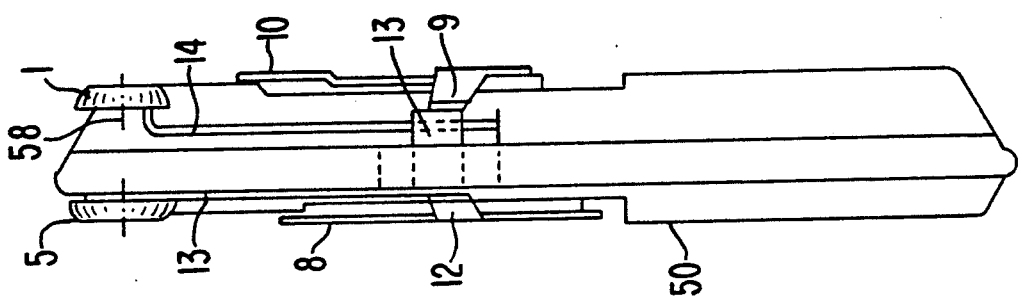
FIG. 5 is a sectional view taken along line V—V of FIG. 3.
Figure 4:
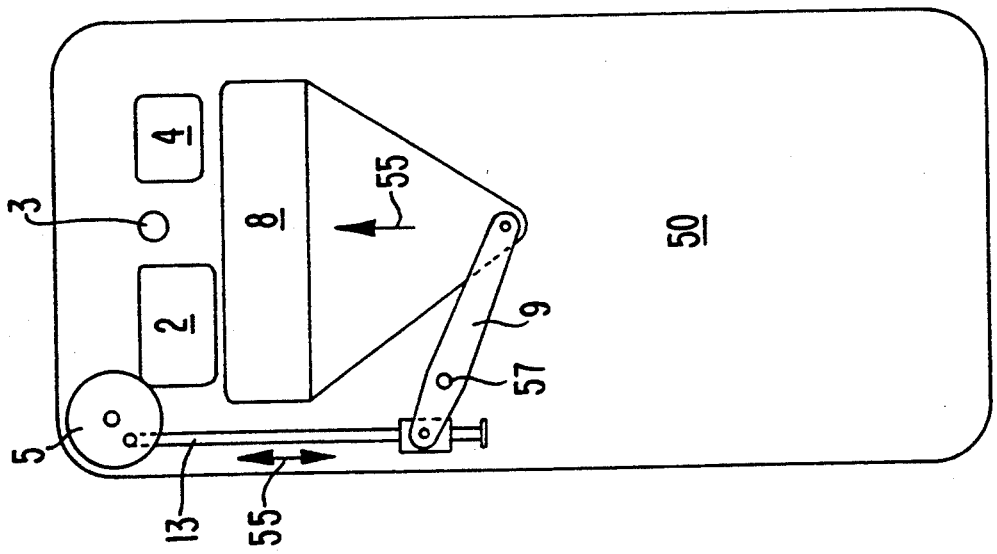
FIG. 4 is a sectional view taken along line IV—IV of FIG. 2.

As can be seen in FIG. 2, and also in FIG. 5, the casing 50 is very shallow, so that it can be inserted, for example, into a vest pocket or into any other pocket.

Figure 12:
FIG. 12 is a representation of the view finder image.
Figure 11:
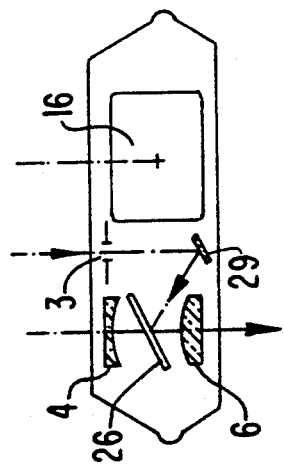
FIG. 11 is a top view of the beam path viewed in the direction of the arrow XII of FIG. 7.
Figure 13:
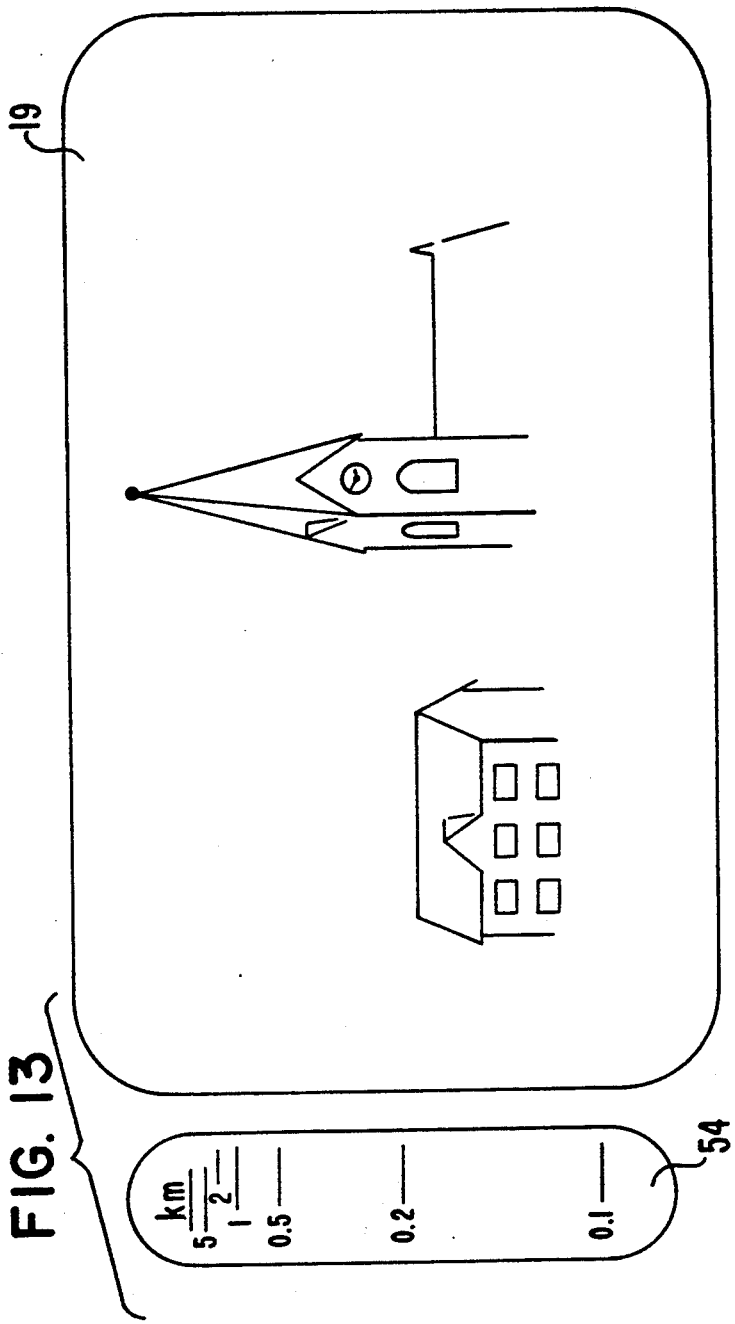
FIG. 13 shows the telescope image for comparison in size to the view finder image in FIG. 12, with an accompanying scale.

The view finder eyepiece 6 and the eye lens 7 of the telescope eyepiece are set very close together, so that the user need only turn his eye slightly from the view finder eyepiece 6 to the ocular lens 7 of the telescope eyepiece in order to shift from the view finder image (FIG. 12) to the enlarged section thereof (FIG. 13). The pivot point of the eye lies at the intersection 28 of the optical axis of the ocular lens 7 of the telescope eyepiece with the optical axis of the view finder eyepiece 6.

The front lens 2 of the telescope objective and the view finder objective 4 are arranged side by side and, taking advantage of the space in the casing, they are spaced apart from one another on both sides of the center line 67. Between them is a window 3 for illuminating a circle of light 30. The distance scale 54 serves to determine the distance of the viewed object (according to FIG. 13 a church and/or a house) if the size of the viewed objects is known or can be estimated.

The circle of light 30 is reflected into the view finder beam path into the center of the view finder image 60. The object surrounded by it will appear enlarged in the image field of the telescope.

According to FIG. 7 the knob 1 shifts the rod 14 in the direction of the arrow 55, so that the mirror slide 24 can be displaced in the direction of arrow 64 in order to focus the telescope.

When the telescope is deployed, a reduced scale image 60 is seen in the view finder according to FIG. 12.

If now the line of sight of the eye is lowered, for example in FIG. 3 from the view finder eyepiece 6 to the telescope eyepiece 7, a magnified image 19 of the view finder image 60 is obtained. The distance scale 54 can be provided beside the image 19 and in front of it a light-refracting prism 23 is mounted.

Since the telescope has an extremely flat and shallow configuration, the optical elements that serve for the imaging must be mounted in the casing 50 in such a way that on the one hand they will provide perfect imaging, and on the other hand they will permit focusing on the object being viewed, and further so that they will also produce the usually necessary image inversion.

To achieve this, the objective and the ocular are each chromatically corrected. The telescope objective 2, 17 (FIG.10) is constructed in divided form as an achromatic lens such that the chromatic correction is shifted to the second part 17 of the objective. The correction of the telescope eyepiece 7 is shifted to the field lens 20 so that the thickness of the eye lens will not be multiplied, because there is more space available there in the beam direction.

According to FIG. 10, between the front lens 2 and the second part 17 of the telescope objective a first planar mirror 16 is provided, which deflects the beam path in the direction of the arrow 61 approximately perpendicularly into the base plane, downward into the casing at about 30 minutes of angle from the perpendicular. The image field is marked 19 (FIGS. 7 and 8). In the bottom part of the casing 50, the beam path strikes two planar mirrors (18) disposed at a right angle to one another, which turn the beam path upward in the direction of arrow 62. Thus the beam path reaches the eyepiece deflected laterally from the central axis 67 in the casing. It strikes an additional planar mirror 21 which directs the image beams through the eye lens 7 of the telescope eyepiece to the pivot point of the eye 28. As a result of this configuration, considerable space is saved, and the flatness of the beam's course is assured.

A partially transmitting surface mirror 26 follows the view finder objective 4 (FIG. 8). When the beams pass through in the direction of the arrow 63, the view finder beam path is carried by the view finder ocular 6 (eye lens) to the pivot point 28 of the eye. Depending on whether one looks through the front lens 2 of the telescope objective (FIG. 1) or through the view finder objective 4 (FIG. 1), the object is seen either enlarged through the telescope beam path or it is seen in the large field of view through the view finder beam path. For this purpose only a slight turning of the human eye is necessary.

The partially transmitting surface mirror 26 is provided in order to reflect the light entering through the opening 3 into the view finder image, in the form of a circle of light.

The chief advantage of the invention is seen in the creation of an extremely thin and flat monocular telescope, but one which has the full optical quality of a high-priced telescope, permits focusing, and also has a view finder for the purpose of first obtaining a large general field of view, and then, by a slight turning of the human eye from the view finder beam path to the telescope beam path, without changing the position of the telescope, seeing a magnified section thereof. For this purpose both of the eyepieces are preferably arranged so that the casing will be to the right of the viewing eye; however, this arrangement is not essential. The casing could just as well be disposed on the left side if a person sees better with the left eye. The beam path then needs only to be changed about symmetrically.

The additional advantage of the telescope is that the knob 5 makes it possible to cover the lenses and thus close up the entire casing, enabling the telescope to withstand rough treatment.

The knob 1 (FIG. 7) also provides for a displacement of the two mirrors 18 in the direction of the arrow 64, permitting fine focusing.

The mirror 21 is oriented so that it enables the beam path, as represented in FIG. 8, to emerge in the direction of the arrow 65, upward out of the telescope at an angle, so that it enters the point 28 where it intersects the horizontal view finder beam path. A distance scale 54 is provided for estimating distance. The distance scale 54 is disposed alongside the image field so as not to interfere with the use of the telescope. The distance scale 54 situated laterally beside the image field requires an additional deflecting means, namely the prism 23, which can also be configured as a prismatic segment at the margin of the lens. In this manner the desired images, including the reflections from the mirrors, can be viewed in a space-saving manner.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A monocular telescope with a view finder, wherein the telescope and the view finder have a common sighting direction, a mirror system is provided in the telescope beam path, the view finder comprises at least one view finder objective and a view finder eyepiece which have an optical axis, the telescope comprises at least one telescope objective and a telescope eyepiece with an eye lens, and the axes of the view finder eyepiece and of the telescope eyepiece intersect behind the eyepiece at the pivot point of an observer's eye.

2. A telescope according to claim 1, wherein the ocular lens of the telescope eyepiece and the view finder eyepiece are disposed directly one above the other.

3. A telescope according to claim 1, wherein the optical axis of the eye lens of the telescope eyepiece is aimed toward the eye upwardly at an angle.

4. A telescope according to claim 1, wherein the optical axis of the view finder extends in a straight line to the eye.

5. A telescope according to claim 1, wherein the telescope and the view finder are enclosed by a casing which has a substantially planar surface transverse to the viewing direction.

6. A telescope according to claim 5, wherein the view finder beam path passes substantially perpendicularly through the flat side of the casing.

7. A telescope according to claim 5, wherein the image beam path of the telescope is folded such that the image beam path has an optical axis which describes a substantially flat, approximately rectangular path in the casing.

8. A telescope according to claims 5, wherein the casing is approximately rectangular, and the longer side of the rectangle points downward when the telescope is in use.

9. A telescope according to claims 5, wherein the front lens of the telescope objective and the front lens of the view finder objective are provided on the front of the casing and the eye lens of the telescope eyepiece and the view finder eyepiece are provided on the back of the casing.

10. A telescope according to claim 1, wherein the front lens of the telescope objective is disposed in the upper part of the casing, and the eye lens of the telescope eyepiece is also disposed in the upper part of the casing on the rear side thereof, and that both said front lens and said eye lens are arranged offset from the center of the casing.

11. A telescope according to claim 1, wherein the telescope objective consists of two lens units separated from one another, between which a first planar mirror of an inverting system is provided, such that said first planar mirror turns the imaging beam path into the lower part of the casing.

12. A telescope according to claim 11, wherein said first planar mirror is disposed between the lens units at an angle that is a slight departure from 45° to the axis of entry of light rays.

13. A telescope according to claim 11, wherein said first planar mirror turns the beam path downward at a slight inclination with respect to a longitudinal axis through the telescope.

14. A telescope according to claim 11, wherein a pair of mirrors are provided in the lower part of the casing which turn the beam path into the upper part of the casing toward the telescope eyepiece.

15. A telescope according to claim 14, wherein said pair of mirrors are arranged for displacement together in the direction of the entering light rays in order to focus the telescope.

16. A telescope according to claim 1, wherein said telescope eyepiece consists of two lens units between which a planar mirror is provided.

17. A telescope according to claim 1, wherein said telescope objective and said telescope eyepiece are both chromatically corrected.

18. A telescope according to claim 17, wherein said objective is constructed in divided form as an achromatic lens.

19. A telescope according to claim 17, wherein a field lens of the telescope eyepiece is chromatically corrected.

20. A telescope according to claim 1, wherein the imaging beam path of the view finder is directed through a partially transparent mirror, and a circle of light is reflected by said partially transparent mirror into the view finder image.

21. A telescope according to claims 1, wherein in addition to the view finder objective and the telescope objective in the casing, an illumination opening is provided for a light marker which appears in the image field of the view finder.

22. A telescope according to claim 21, wherein said light marker is a luminous circle.

23. A telescope according to claim 21, wherein the view finder marker is illuminated through a beam path entering at an angle from above.

24. A telescope according to claim 14, wherein a knob for displacing said two mirrors is provided in an upper corner of the casing.

25. A telescope according to claims 5, wherein a knob is provided in an upper corner of said casing, which knob is offset rearward or forward from the casing and operates at least one cover which serves to cover the front lens of the telescope objective or of the view finder objective.

26. A telescope according to claim 25, wherein said cover also covers an illumination opening for a view finder marker.

27. A telescope according to claim 25, comprising an articulated lever mechanism operatively connected to said knob for moving a cover between a first position in which the eye lens of the telescope eyepiece and the view finder eyepiece are covered and a second position in which the eye lens of the telescope eyepiece and the view finder eyepiece are exposed.

28. A telescope according to claim 1, wherein the lenses of the telescope and of the view finder have a rectangular external shape.

29. A telescope according to claim 1, wherein a distance scale is provided which can be viewed adjacent the image field of the telescope.

30. A telescope according to claim 29, wherein a prism member is provided for reflecting the distance scale into the viewing beam path.

31. A telescope according to claim 30, wherein said prism member is a prismatic edge segment on a lens of the telescope.

* * * * *